United States Patent [19]

DeGraffenried

[11] Patent Number: 4,632,755
[45] Date of Patent: Dec. 30, 1986

[54] STACKED FILTER CARTRIDGE

[76] Inventor: Howard T. DeGraffenried, Rte. 3, Box 9, Henryetta, Okla. 74437

[21] Appl. No.: 670,591

[22] Filed: Nov. 13, 1984

[51] Int. Cl.$^4$ ............................................. B01D 29/46
[52] U.S. Cl. .................................. 210/314; 210/318; 210/488; 55/489
[58] Field of Search .................... 210/314, 318, 323.1, 210/340, 341, 346, 347, 488; 55/484, 485, 489

[56] References Cited

U.S. PATENT DOCUMENTS

| | | |
|---|---|---|
| 1,694,939 | 12/1928 | Heftler . |
| 1,793,583 | 2/1931 | Bowden ............................. 210/488 |
| 2,389,431 | 11/1945 | Hallinan .............................. 210/183 |
| 2,495,095 | 1/1950 | Ewbank ............................... 210/169 |
| 2,501,582 | 3/1950 | Rohland ............................... 210/169 |
| 2,548,584 | 4/1951 | Briggs .................................. 210/169 |
| 2,554,016 | 5/1951 | Czarnecki, Jr. et al. ........... 210/179 |
| 2,604,994 | 7/1952 | Vocelka ............................... 210/169 |
| 2,692,685 | 7/1952 | Garland .............................. 210/488 |
| 2,755,937 | 7/1956 | Gun ..................................... 210/169 |
| 3,294,241 | 12/1966 | Sicard et al. ........................ 210/347 |
| 4,107,050 | 8/1978 | Wilansky ............................. 210/492 |

FOREIGN PATENT DOCUMENTS

| | | | |
|---|---|---|---|
| 582971 | 1/1925 | France | ................. 210/318 |
| 902770 | 9/1945 | France | ................. 210/488 |
| 1033481 | 7/1953 | France | ................. 210/488 |
| 1136204 | 5/1957 | France | ................. 210/488 |

Primary Examiner—Richard V. Fisher
Assistant Examiner—Wanda L. Millard
Attorney, Agent, or Firm—John F. Hoffman; Albert L. Jeffers

[57] ABSTRACT

This invention pertains to a fluid filter apparatus and more particularly to an improved fluid filter apparatus in which a plurality of disc-like filter elements or pads is preferably mounted on a perforated tubing, although, it can work without the tubing. Each filter element is a disc-like member having a hole cut in the center and is made of a filtering type material such as fiberglass, paper or felt. Each element is cut in a pattern such as a square, triangle or hexagon whose sides are straight or curvilinear which can be cut without waste. Adjacent stacked disc filter elements are orientated such that the configuration of two adjacent filter elements does not coincide. For example, in regard to a square type configuration filter element, adjacent elements are preferably rotated 45° with respect to each other from their aligned position.

11 Claims, 7 Drawing Figures

STACKED FILTER CARTRIDGE

BACKGROUND OF THE INVENTION

This invention pertains to a fluid filter apparatus including a container having a filtered cartridge disposed therein. Fluid flows into the container through an inlet where it is forced through the filtered cartridge into a perforated tubing in a hole in the center of the cartridge and out an outlet from the container.

Typically, a filtration apparatus generally comprises a filter vessel of generally cylindrical shape containing a replacable filter cartridge for filtering contaminants from a fluid. A typical filter cartridge comprises a filter medium or media, a support member for the media, and an endcap on each end of the media. These filter vessels are generally cylindrically shaped for ease in manufacturing, and a desired objective is to have each filtered cartridge to remove as much of the solid contaminants as possible and to have as long a life as possible. Filters may be classified in two basic types:

(1) Surface Type. Surface filtration in which the bulk of the solids removed is retained on the surface of the filter media; and (2) Depth Type. By using a low density filter media, solids are permitted to penetrate into the depth of the filter media. Obviously, larger particles are stopped near the surface, whereas smaller particles pass deeper and deeper into the media.

In both types of filtration, filtered solids will frequently compact in such manner to give much improved efficiency of filtration in that the particles tend to cake on the surface. The cake acts as a very good filter.

Since depth type cartridges generally have a relatively small surface are, any caking on the surface will result in shorter filter life. Caking on the surface improves filtration efficiency, and in turn, higher differential pressures. Most depth type filters have a relatively small outer surface. Efforts have been made in the past to find ways of increasing that surface and, in turn, increase the life of the filter. One common method for increasing the surface area is to groove the outer surface with grooves which are circumferencially around the cartridge. Other methods are to groove longitudinally in a radial direction. Other variations of grooves are used on occasion.

In some instances, the oil filter cartridge has been made from stacked disc-like filters such as shown in U.S. Pat. No. 2,495,095 and in U.S. Pat. No. 2,554,016. Other patents in this area include U.S. Pat. Nos. 1,694,939; 2,389,431; 2,501,582; 2,548,584; 2,604,994; 2,755,937 and 4,107,050.

It is an object of this invention to have an enlarged filtering area for a given amount of filtering material.

It is a further object of this invention to prevent waste of filtering material.

It is a further object of this invention to make a cartridge of simple, easily formed shapes.

SUMMARY OF THE INVENTION

The present invention concerns a filter system including a filtered cartridge which is composed of a plurality of stacked disc-like filters or pads having a hole cut in the center thereof. The particular shape and orientation of the discs which make up the filtered fluid cartridge for a given size container, increases the life of the filter over the conventional filters. It increases the holding capacity and increases surface are exposed to the oil to be filtered within the container. The filter pads can be of any of several types or shaped polygons which can include triangles, quadrangles and hexagons possessing sides which are straight or curvilinear. In a preferred embodiment, hexagonal, quadrangular or triangular shaped sections or disc-like pads are cut from a low density sheet-like filter medium such as fiberglass. The dimensions of the squares or triangles dictate the overall envelope size or diameter of that filter. Each section is punched to have an internal hole which may be round, triangular, hexagonal or some peculiar shape to improve the location or orientation of that particular section or disc. These discs are stacked one on top of the other to form the oil filtering cartridge with a hole in the center through which a perforated tube may be inserted. The discs have exterior shapes that are complementary to respective adjacent discs in the stack. The orientation of these discs are staggered one such that the corners of the discs extend radially beyond the side edges of adjacent discs with respect to the next adjacent one. In the case of square discs, the corners of one disc are 45° removed from the disc of the adjacent disc.

This method gives an increased exposed surface area to the flow of fluid and thus increases efficiency of cartridges of a particular size. In my filter, the surface of the edges of each pad and a portion of both the top surface and bottom surface are exposed and are all a part of the filtering area. This provides a greater filtering surface from the prior art filter and thus is a significant improvement.

Further, except for a hole cut in the center which is done in all filters, there is no wasting of any filtering material for pads having the configuration of substantially a triangle, rectangle, or hexagon having straight or curvilinear sides.

By stacking these disc-like filters to a predetermined height, then compressing the entire stack to some predetermined dimension, the density of that stack of elements can be determined.

The various objects and a better understanding of the invention can be had from the following description taken in conjunction with the drawings.

DETAILED DESCRIPTION OF THE INVENTION

Figure 1:
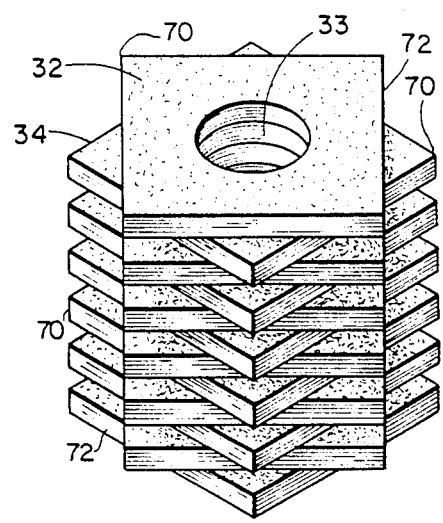
FIG. 1 illustrates an oil filter cartridge composed of non-aligned square-shaped filter pads with a hole cut therein.

Attention is first directed to FIG. 1 which shows a fluid filter cartridge without the center perforated tube. It includes a series of discs or pads 32 and 34 which are shaped as a square with a hole 33 cut in the middle thereof. Alternating pads 32 and 34 are staggered with respect to each other. The corners 70 of the adjacent pads are a radial distance of 45° with respect to the center of hole 33. These pads are preferably made of some filter material such as fiberglass, but may be made of other material such as felt, paper or any filter material in sheet form. All of the pads in the cartridge of FIG. 1 can be cut from a sheet of filtering material, a minimum of waste. Considerable waste would result in the case if they were cut in a circular form, for example. The only waste, of course, is the hole 33 which is apparent in any filtering material of the cartridge type. Except for the hole 33, there is no waste in preparing the filtered cartridge of FIG. 1 from a sheet or sheets of filtering material.

The filter cartridge of FIG. 1 is composed of a plurality of layers 32 and 34 and can be stacked to any desired height. Then, the entire stack can be compressed in any obvious manner to some pre-determined dimension and the density of that stack can be determined. If one wishes to have a stack of particular density, the amount of compression would be applied accordingly. By taking a given number and size of fibers in the filtered pads 32 and 34 and compressing them, more fibers may be compressed in a fixed domain and then we can greatly improve the efficiency of the solids removal.

Figure 3:
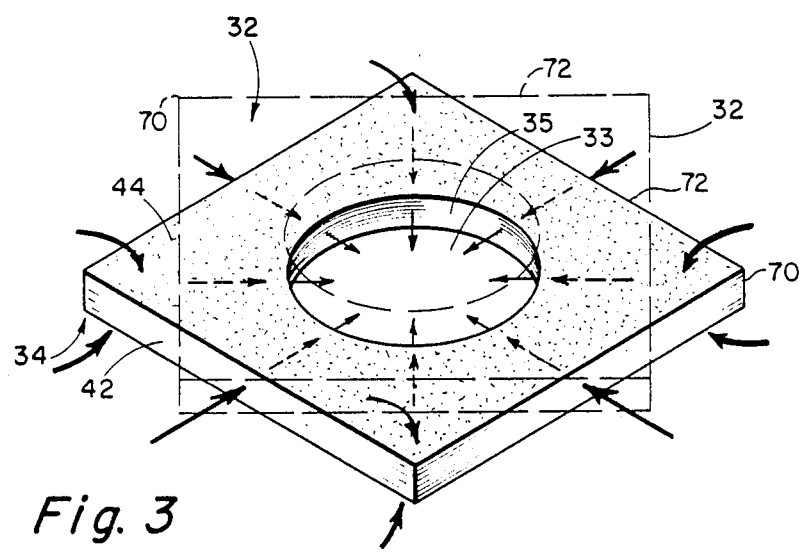
FIG. 3 illustrates the flow of oil through an individual pad of FIG. 1.

Attention is next directed to FIG. 3 which illustrates the many flow paths of the fluid being filtered through the pad 34. In general, the fluid flows from the exposed surface of the cartridge of FIG. 1 inwardly through the filtering material through the surface 35 of hole 33. This flow includes horizontal flow through the edges 42 and flow through upper surface 44 (and the corresponding under surface or bottom of the pad). The flow is indicated by the arrows which enter either horizontally or vertically to any exposed area of the disc 34 and then flows through the filter media of the disc 34 to hole 33 through the surface 35 of the hole.

By alternatingly staggering the filter discs 32 and 34 such that a corner 70 of one pad extends radially beyond the side edge 72 of an adjacent pad, one pad covers only a portion of the other pad and the remaining portion 70 of that pad which is not covered is, of course, exposed. That exposed area then increases the effective surface area of filtration. This staggering of the orientation not only maintains the open area or edges of the pads to filtration, but also exposes a part of the flat surface of these pads to filtration. This gives an improved solids holding capacity of the filter. As I said earlier, increasing the area of a filtered cartridge improves its life and also its filtering capacity.

Another advantage to the use of the fabrication system in this cartridge such as shown in FIG. 1 as pointed out above, is that for a given sheet of filtering material, we eliminate any waste of the original sheet from which the small sections are formed. The only waste is when the hole is punched in the center. This is also true for pads having configurations of substantially a triangle, quadrangle and hexgon whose sides are straight or curvilinear.

Figure 2:
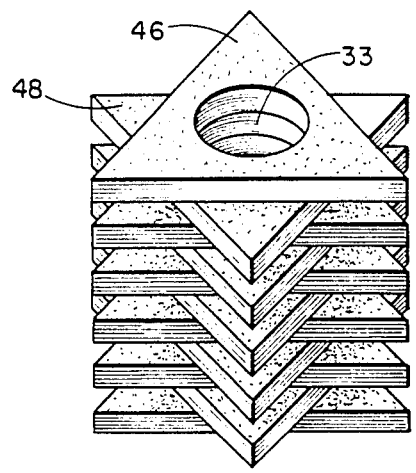
FIG. 2 is similar to FIG. 1 except the configuration of the individual pad is a triangle.

Attention is next directed to FIG. 2 which illustrates a fluid filter cartridge similar to that of FIG. 1. However, pads 46 and 48 are triangular in configuration instead of a square as shown in FIG. 1. Again, the adjacent filter pads 46 and 48 are in a staggered relationship and the points of two adjacent triangles are approximately 60° apart in a preferred and most efficient arrangement. The advantages pointed out in regard to FIGS. 1 and 3 are also available for the fluid filter cartridge configuration shown in FIG. 2.

Although the various configurations can be used, it is considered that for a given amount of material, the square shaped pads of FIG. 1 is perhaps the most efficient use of the filtering material. As the number of sides of a configuration increases, the efficiency decreases. It has been determined that a configuration of six sides is about the upper limit of the number of sides which one would want to use.

The various pads are rotated with respect to each other, an amount depending upon the configuration. If the pads are in the shape of a square then each adjacent pad is rotated preferably in the range of 22½° to 45° with respect to each other from the aligned position. If the configuration is a hexgon, then the adjacent pads are rotated with respect to each other preferably in the range of 15° to 30°.

Figure 4:
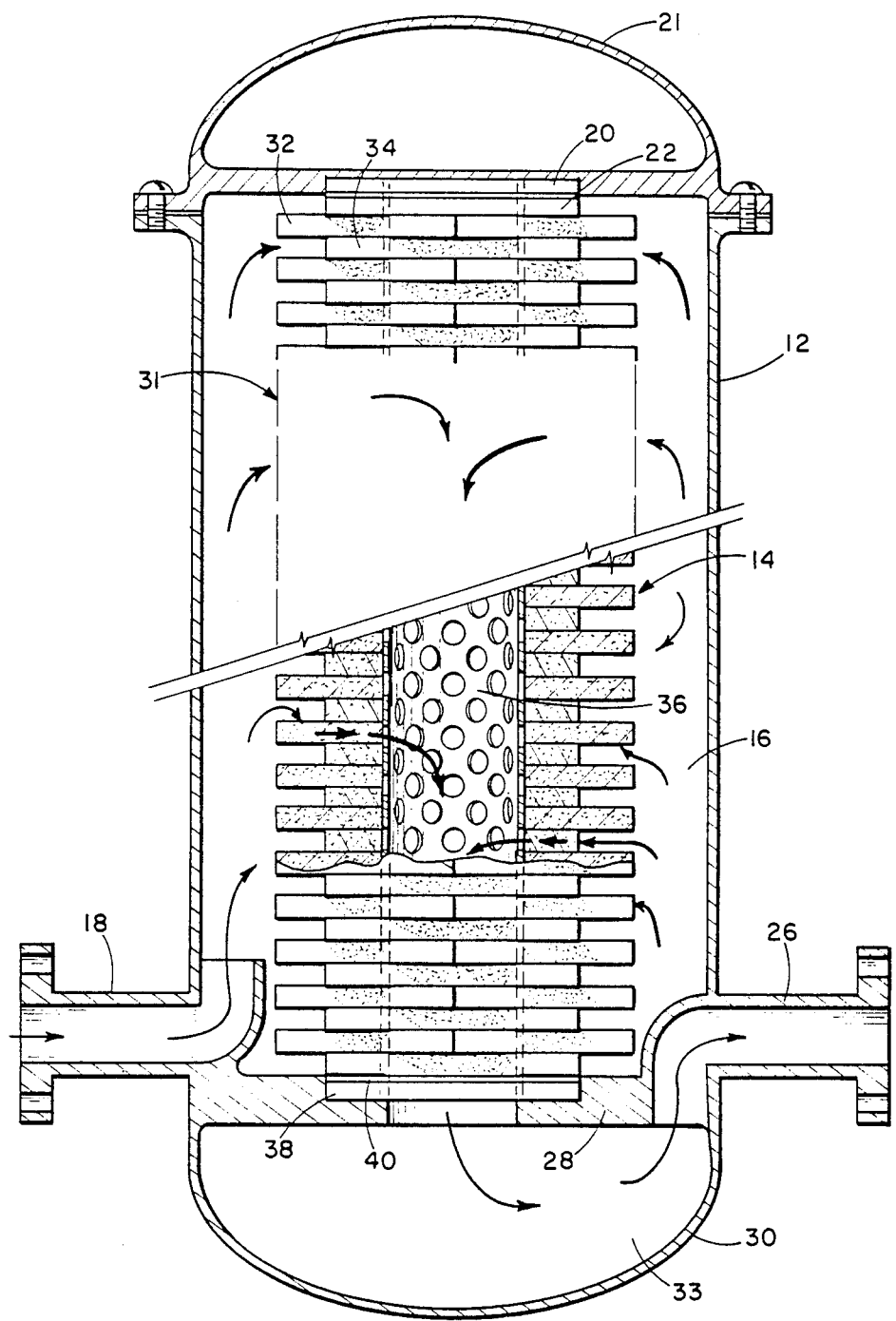
FIG. 4 illustrates the cartridge of FIG. 1 in a container to make a complete oil filtering unit.

Attention is next directed to FIG. 4 which illustrates a complete filter assembly unit in which the cartridge element of FIG. 1 has been incorporated. Shown thereon is a vessel 12 having an interior 16 into which the filter elements 32 and 34 as shown in FIG. 1 have been serted. These filter pads 32 and 34 have been placed about a perforated tube 36 and have been compressed down to the desired dimension to prevent passage of unfiltered fluid between the pads and they are held in place about the tube 36 by hold down plate 22 at the top and by plate 40 at the bottom whch may be secured to the tube 36 in any known manner. The filter cartridge including the hold down plate 22 and plate 40 are inserted within the container by removing top 21. A gasket 38 is provided in deck plate 28 which is supported in end member 30. This gasket may be of the same material as the pad or may be one of the pads. At the upper end, a seal is effected by the head 21 against the gasket or pad 20 and gasket or pad 38 against the plate 28.

The fluid which is to be filtered enters through inlet 18 which flows into the annulus 16 inside filter container 14 and then flows through the filter pads 32 and 34 all as explained above in regard to FIGS. 1 and 3. The fluid to be filtered then flows through tube 36, down through the collecting space 33 in end member 30 and out through outlet 26. The size of vessel 12 may be any desired size, for example, it may be 3 to 4 inches in diameter or smaller and it may be as large as 60 inches in diameter or larger and the length or height of it may be as small as one inch or less and as long as 48 inches or more. Any desired length and size, of course, can be utilized.

The tube 36 may, in some cases, not be needed. I can hold the pads together by applying longitudinal force and the pads will form a filter having a center hole with no separate tube needed. I can also hold the pads together with an adhesive agent such as thermoplastic powder or fibers or some thermosetting material.

Figure 5:
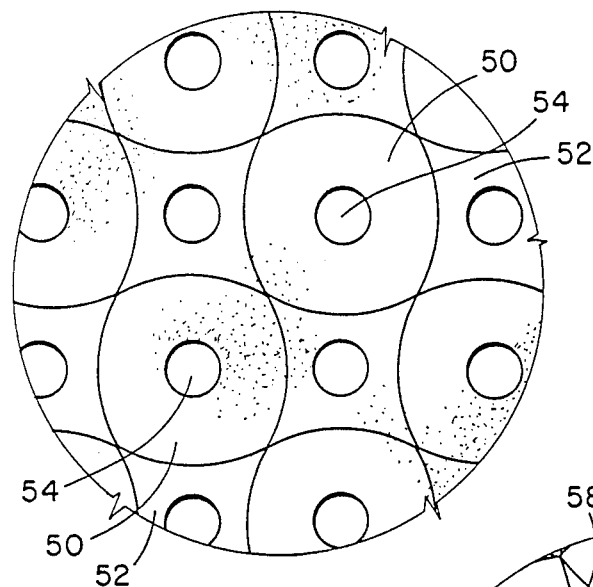
FIG. 5 illustrates a quadrangular pattern having curvilinear sides.
Figure 6:
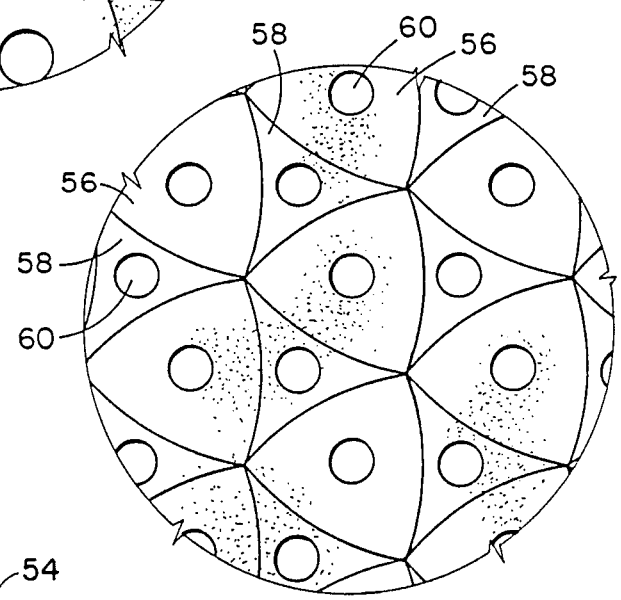
FIG. 6 illustrates a triangular pattern having curvilinear sides.
Figure 7:
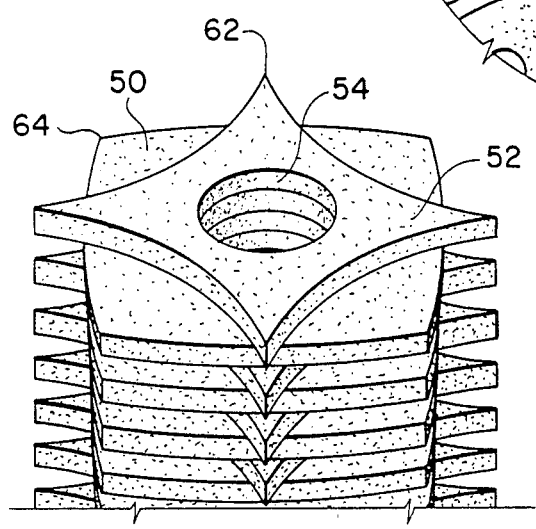
FIG. 7 illustrates a stacked filter having disc pads whose shape is quadrangular with curvilinear sides.

FIGS. 5, 6 and 7 show modifications of my invention from that shown in regards to FIGS. 1 and 2. As we stated above, the pads can be of any of several types of shaped polygons which can include triangles, quadrangles and hexagons possessing sides which are straight or curvilinear. FIGS. 5 and 6 show quadrangles and triangle type respectively, each having sides which are curvilinear. Shown in FIG. 5 is a pattern for filter pads in accordance with my invention in which the only waste is for the individual holes 54 which may be cut therein.

Shown thereon are a plurality of quadrangles 52 having curvilinear sides which are convex and a plurality of alternating quandrangles 52 having curvilinear sides which are concave and which exactly complements the sides of the pads 50.

FIG. 6 is similar to FIG. 5 except that it has a pattern of trangles possessing sides which are curvilinear. Shown thereon is a plurality of triangles 56 having curvilinear sides that are convex and a plurality of triangular figures 58 having sides who are curvilinear and are concave. It is seen that the sides of triangles 56 and 58 exactly complement each other so that here too, there is no waste in the cutting of the individual disc from a sheet of filter material. Each triangular shaped pad has a hole 60 cut therein.

FIG. 7 shows a stacked filter similar to FIG. 1 except that the shape of the individual pads is quadangular with curvilinear sides. In this particular arrangement, each corner 62 of pad 52 and each corner 64 of pad 50 are aligned. If desired, the alternating pads 50 and 52 can be rotated so as to have the orientation that the pads 32 and 34 similar to that of FIG. 1.

While the invention has been described with a certain degree of particularity, it is manifest that many changes may be made in the details of construction without departing from the spirit and scope of this invention. It is understood that this invention is not limited to the embodiment set forth herein for purposes of exemplification, but is limited only by the scope of such claim or claims including the full range of equivalency to which each element thereof is entitled.

What is claimed is:

1. A fluid filter cartridge comprising:

a plurality of filter pads, each pad having means defining an axial hole therein, opposite faces and a plurality of substantially straight edges not exceeding six in number, adjacent edges of the pad forming the corners, said pads being stacked one on top of the other such that the holes are aligned, the exterior shape of each pad being complementary to the exterior shape of an adjacent pad in the stack, and said pads being staggered in the stack such that the exterior shape of adjacent pads do not coincide and the corners of the pads extend radially beyond the straight edges of adjacent pads in the stack so that each pad has both edge surfaces and face surfaces exposed.

2. A filter cartridge as defined in claim 1 in which said configuration is a square.

3. A fluid filter cartridge as defined in claim 1 in which each said pad has a configuration of a triangle.

4. A fluid filter cartridge as defined in claim 1 in which said pad has a configuration of a rectangle.

5. A fluid filter cartridge as defined in claim 1 in which each said pad is made of material selected from the list of: fiberglass, natural fiber, synthetic fiber, all of which can be made into pads.

6. The fluid filter cartridge as defined in claim 1 in which each said pad has configuration of a square and adjacent pads are rotated in the range of $22\frac{1}{2}°$ to 45° with respect to each other from an aligned position.

7. A fluid filter cartridge as defined in claim 1 in which each said pad has a configuration of a triangle and are staggered such that adjacent pads are rotated 30° to 60° with respect to each other.

8. A fluid filter cartridge comprising:

a plurality of filter pads, each pad having means defining an axial hole therein, opposite faces and a plurality of curvilinear edges not exceeding six in number, adjacent edges of the pad forming the corners, said pads being stacked one on top of the other such that the holes are aligned, the exterior shape of each pad being complementary to the exterior shape of an adjacent pad in the stack, and said pads being staggered in the stack such that the exterior shape of adjacent pads do not coincide and the corners of the pads extend radially beyond the curvilinear edges of adjacent pads in the stack so that each pad has both edge surfaces and face surfaces exposed.

9. The fluid filter cartridge of claim 8 wherein alternating pads have sides which, in a first pad, are concave, and in the adjacent pad, are convex and complementary to the concave sides of the first pad.

10. A fluid filter comprising:

cylindrical container having an upper end and a bottom, a deck plate in said container near said bottom and an inlet means on one side of said deck plate and an outlet means on the other side of said deck plate;

a filter cartridge disposed in said container, said cartridge comprising a plurality of filter pads, each pad having means defining an axial hole therein, opposite faces and a plurality of substantially straight edges not exceeding six in number, adjacent edges of the pad forming corners; said pads being stacked one on top of the other such that the holes are aligned; the exterior shape of each pad being complementary to the exterior shape of an adjacent pad in the stack; said pads being staggered in the stack such that the exterior shapes of adjacent pads do not coincide and the corners of the pads extend radially beyond the straight edges of adjacent pads in the stack so that each pad has both edge surfaces and face surfaces exposed;

a perforated tube received within the aligned holes of the stacked pads; and sealing means sealing the ends of said cartridge with the upper end and the deck plate of said container.

11. A filter as defined in claim 10 in which said pads are compressed and held in a compressed position therein to obtain a pre-selected density of filter media.

* * * * *

UNITED STATES PATENT AND TRADEMARK OFFICE
CERTIFICATE OF CORRECTION

PATENT NO. : 4,632,755
DATED : December 30, 1986
INVENTOR(S) : Howard T. DeGraffenreid It is certified that error appears in the above—identified patent and that said Letters Patent is hereby corrected as shown below:

```
Claim 2, line 1, after "A" insert --fluid--.
         line 1, after "which" insert --each--.
         line 2, before "configuration" insert --pad has a--.
         line 2, delete "is" and insert therefor --of--.
```

Signed and Sealed this

Seventeenth Day of March, 1987

Attest:

DONALD J. QUIGG

Attesting Officer

Commissioner of Patents and Trademarks